United States Patent [19]
Casey et al.

[11] 4,181,952
[45] Jan. 1, 1980

[54] METHOD AND MEANS FOR MINIMIZING ERROR BETWEEN THE MANUAL DIGITIZING OF POINTS AND THE ACTUAL LOCATION OF SAID POINTS ON AN ELECTRONIC DATA ENTRY SURFACE

[75] Inventors: Richard G. Casey; Glen G. Langdon, Jr., both of San Jose; Patrick E. Mantey, Los Gatos; Robin Williams, San Jose, all of Calif.

[73] Assignee: International Business Machines Corporation, Armonk, N.Y.

[21] Appl. No.: 853,150

[22] Filed: Nov. 21, 1977

[51] Int. Cl.² .............................................. G08C 21/00
[52] U.S. Cl. .................................... 364/515; 178/19; 340/709; 364/561
[58] Field of Search ................. 364/515, 561; 178/18, 178/19; 340/709, 707, 711, 782

[56] References Cited

U.S. PATENT DOCUMENTS

| | | | |
|---|---|---|---|
| 3,832,693 | 8/1974 | Ishizaki et al. | 178/19 |
| 3,967,266 | 6/1976 | Roy | 340/709 |
| 3,974,493 | 8/1976 | De Cavaignac et al. | 340/709 |
| 4,080,515 | 3/1978 | Anderson | 178/19 |
| 4,101,879 | 7/1978 | Kawaji et al. | 340/709 |
| 4,138,592 | 2/1979 | Capehart et al. | 178/19 |

FOREIGN PATENT DOCUMENTS 1409761 10/1975 United Kingdom ................... 364/515

Primary Examiner—Felix D. Gruber
Attorney, Agent, or Firm—R. B. Brodie

[57] ABSTRACT

There is disclosed a method and means for increasing the positional accuracy of operator controlled cursors engaged in the digitized encoding of graphic information such as line drawings. The method steps comprise those of digitizing the instantaneous contact position between the cursor and the data entry surface as reference coordinates; detecting any segment of a colored object upon the surface within a predetermined area about the cursor; ascertaining the location within the area of the centroid or the like of the detected segment; and digitizing said ascertained location as a displacement from the reference coordinates. Apparatus for practicing the method comprises an independently actuable cursor formed from a position encoder and an image scanner, the scanner generating a Boolean coded array of points counterpart to a preselected surface area. The scanned array is first buffered and then used to actuate an operator viewable LED display of the scanned array on one hand and said array is sent to a CPU on the other hand. In turn, the CPU calculates the coordinates of the centroid of that array area of contiguous points having the same designated Boolean (color) 0 or 1 value. Signals representing the calculated coordinates generated by the CPU then cause the LED display to differentially indicate the calculated centroid location to the operator such as by way of a flashing display element.

9 Claims, 5 Drawing Figures

DIRECT VIEW SCANNER ATTACHMENT IN COMBINATION

DIRECT VIEW SCANNER ATTACHMENT IN COMBINATION $N = Lw$ $$u = \left[\left(\frac{L+1}{2}\right), \left(\frac{w+1}{2}\right)\right]$$

$$\overline{x^2} = \frac{1}{L}\sum_{i=1}^{L} i^2 = \frac{2L^2+3L+1}{6}$$

$$\sigma_x^2 = \frac{L^2-1}{12}, \quad \sigma_y^2 = \frac{w^2-1}{12}$$

$$L = \sqrt{12\,\sigma_x^2 + 1}$$

$$w = \sqrt{12\,\sigma_y^2 + 1}$$

LINE DESCRIPTION BY MOMENT

DIRECT VIEW SCANNER LOGIC

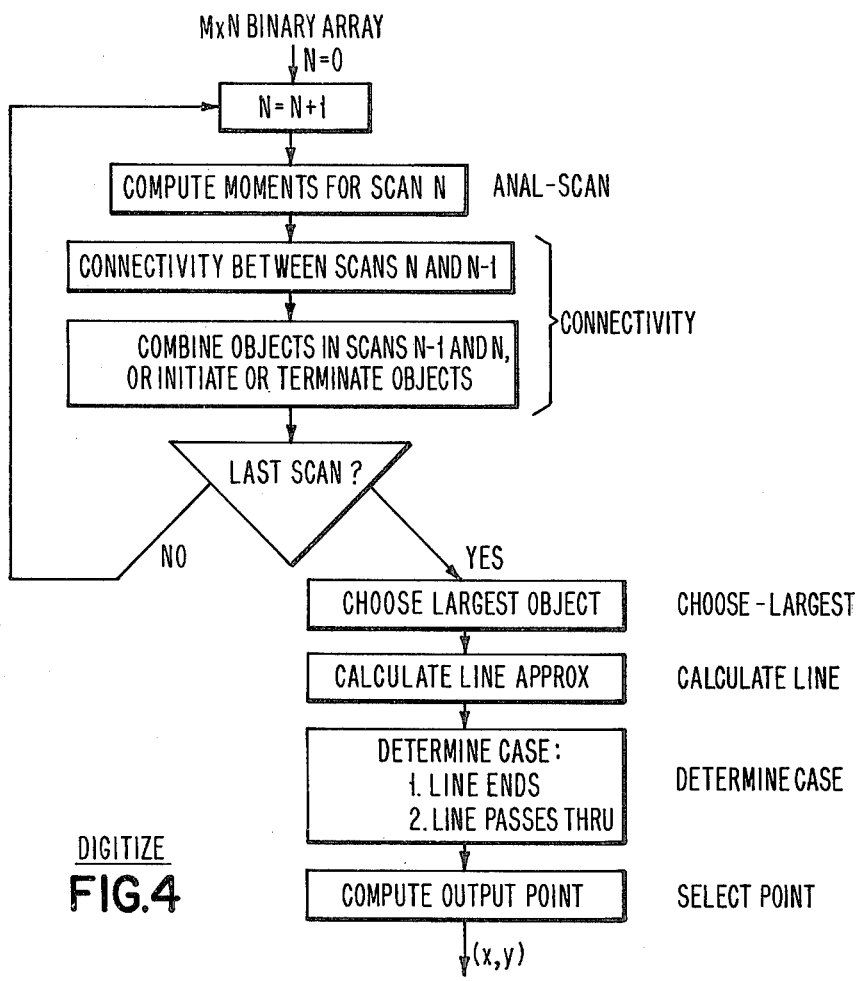
FIG. 4 DIGITIZE
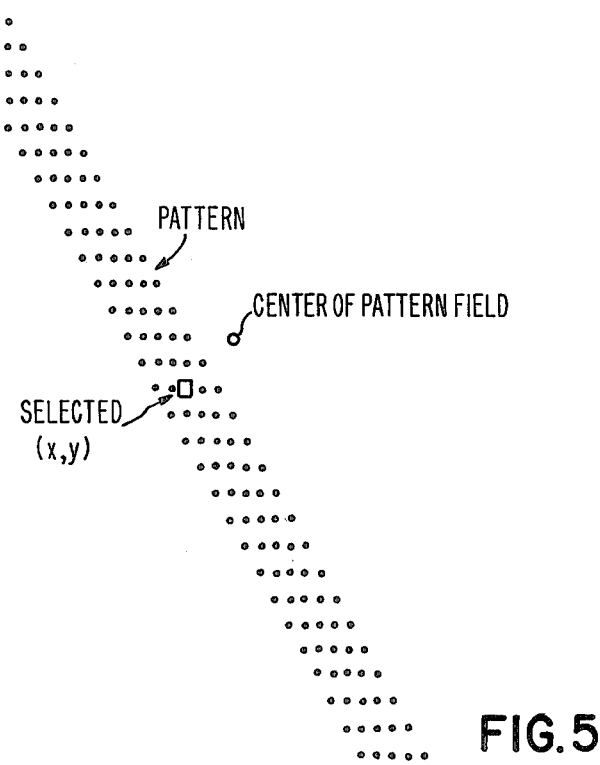
FIG. 5

METHOD AND MEANS FOR MINIMIZING ERROR BETWEEN THE MANUAL DIGITIZING OF POINTS AND THE ACTUAL LOCATION OF SAID POINTS ON AN ELECTRONIC DATA ENTRY SURFACE

BACKGROUND OF THE INVENTION

This invention relates to the measurement of cursor displacement relative to a path on an electronic data entry surface being manually followed. More particularly, the invention relates to a method and means for minimizing the error between the cursor and the actual location of the points being tracked by the cursor.

In the prior art, the positioning of a cursor or stylus relative to an electronic data entry surface has been concerned with obtaining highly accurate and precise absolute location information. P. Mantey, in Vol. 19 of the IBM Technical Disclosure Bulletin at page 1889, published in October 1976, described light pen location vis-a-vis a video terminal as the electronic data entry surface. The problem he confronted was that light blast obscured the light pen detection of data characterizing the least significant digits of the light pen coordinate position relative to the video surface. He suggested using interruption of an external flat detection field parallel to the video surface for initial coarse reference of the cursor position coordinates followed by the generation of a repeated raster scan line pattern in a reduced region around the reference coordinates. The lesser significant digits (displacement) of the coordinates were obtained when the light pen detected a pattern in the reduced field. In a similar manner, Hoo, in Vol. 18 of the IBM Technical Disclosure Bulletin, at page 1498, published in October 1975, taught the use of a self-scanned sensor array in a reduced region about a cursor. The light sensor read a coded grid illuminated by a local light source for location purposes.

There are many schemes for using a matrix of conductors and determining the cursor position relative thereto by generating electric fields of one kind in order to obtain a coarse scan and fields of another kind in order to obtain a fine scan. This is taught by Carvey, U.S. Pat. No. 3,975,592 issuing on Aug. 17, 1976.

An interactive stylus sensor for use with a gas panel display is described in Hoo, U.S. Pat. No. 3,958,234, issuing on May 18, 1976. Here the sensor includes a hand-held stylus having a plurality of spaced plates such that they capacitively interact with adjacent row and column conductors as signal potentials are applied thereto by the normal gas panel addressing circuitry. The capacitive interaction of the plates allows signals to be picked up from the row and column conductors. The signals are differentially amplified to give a detect signal of the stylus position in the display.

Broadly, electronic data entry devices of the types described in the above references relate to the computer input of graphic position or information, such as is found on maps and line drawings. The input process of positioning a cursor to trace out a series of points is slow and tedious especially if high accuracy is required. The input consists of entering information indicative of coordinate position on a point by discrete point basis. This requires a digitizing device.

Several methods exist for "digitizing" maps, line drawings or pictures. The result of the digitization process is either an array of M×N picture elements, each possessing a value (black, white, color or gray scale value), or a description of the object of digitization in terms of points, lines (vectors), or other primitive shapes. Of importance is the relative location of the points, the M×N array being considered as a coordinate grid with each pel location being defined by an x coordinate and a y coordinate.

For converting an entire picture (image or drawing) into a digitized pel array, an optical scanning element is used to detect light as it is passed across the surface of the drawing in combination with a position sensing device. In one contemporary system, the drawing is fixed and the scanning head passes over the drawing. There are also what is popularly termed "drum digitizers." In these the drawing is wrapped around a drum. The drum rotates as the scanner head passes across the surface parallel to the drum axis. In both of the aforementioned systems, the entire drawing is scanned and converted into an array of pels.

In yet another system, a drawing surface or tablet is used in conjunction with a position sensing mechanism. A function key is depressed which "tags" the point together with its digitized point coordinates. In this manner, a drawing or map may be digitized as vectors or lines. Using the order of digitization of successive points as a parameter, a point is identified as the beginning of a line, as an end of a line, or as a corner of a polygon. In sparse drawings or maps it is more storage efficient for the information to be represented as a set of lines in contrast to that of a pel array. Furthermore, for map processing operations, such as magnification, minification (reduction), and rotation, usage of the information is facilitated by storing the drawing in line or vector form.

SUMMARY OF THE INVENTION

It is accordingly an object of this invention to minimize the error in position between a cursor and each point of a locus of points on an electronic data entry surface.

It is yet another object to improve the positional accuracy of digitized point operator-controlled cursors engaged in the digitized encoding of graphic information such as line drawings. It is a related object to provide feedback information superimposed on an image of the original data.

These and other objects are satisfied by method steps comprising the digitizing of the instantaneous contact position between the cursor and the electronic data entry surface as reference coordinates; detecting any segment of a colored object consisting of at least one point of a set of contiguous points of the same color value upon the surface within a predetermined surface area about the cursor; ascertaining the location within the array as the centroid of the detected segment; and digitizing said ascertained location as a displacement from the reference coordinates. The objects are also satisfied by an apparatus for practicing the method comprising an operator actuated cursor formed from a position encoder and an image scanner, the image scanner generating a Boolean coded 0 or 1 array of points in column major order of a corresponding part of the surface area. By this is meant that a scanning device views a two dimensional surface and generates an array of ones and zeros corresponding to discrete areas of light or darkness of that portion of the surface area within the view of the scanner. The position encoder provides an x and y coordinate of a surface area position representing the point of contact of the cursor with a point on the contact surface near the one of a locus of points being followed by an operator for data entry purposes. The apparatus further comprises in combination an operator viewable display, a CPU; means for coupling the scanner for actuating the display with the scanned array and for transmitting said array data to the CPU, the CPU being responsive to said data and including means for calculating the coordinates of a geometrical feature, such as a line intersection, or the centroid of an array area of contiguous points having the same preselected Boolean value; and means including the CPU for causing the display means to differentially indicate the location of the geometric feature, such as by way of a flashing light in a light emitting diode (LED) array.

BRIEF DESCRIPTION OF THE DRAWING

FIG. 4 sets forth a flow diagram of the information handling sequences of the CPU responsive to digitized inputs from the image scanner and generating a signal for actuating a selected one of the diodes in the LED array.

FIG. 5 shows a $M \times N$ array typically seen by the image scanner and represented on the LED array together with the point representing the selected geometrical feature.

DESCRIPTION OF THE PREFERRED EMBODIMENT

Figure 1:
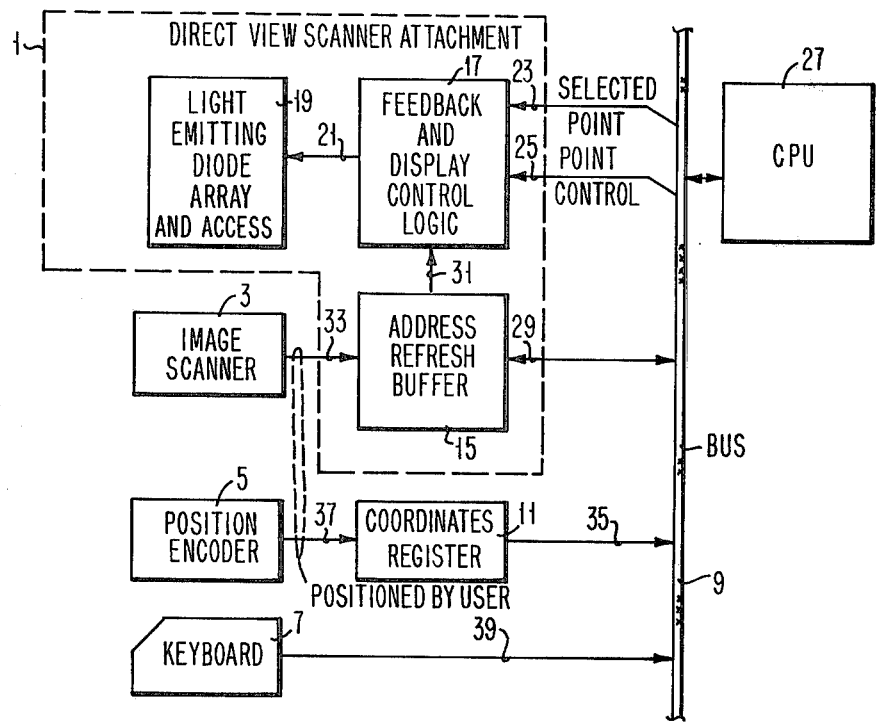
FIG. 1 represents a direct view scanner attachment in combination with a cursor and a CPU.
Figure 2:
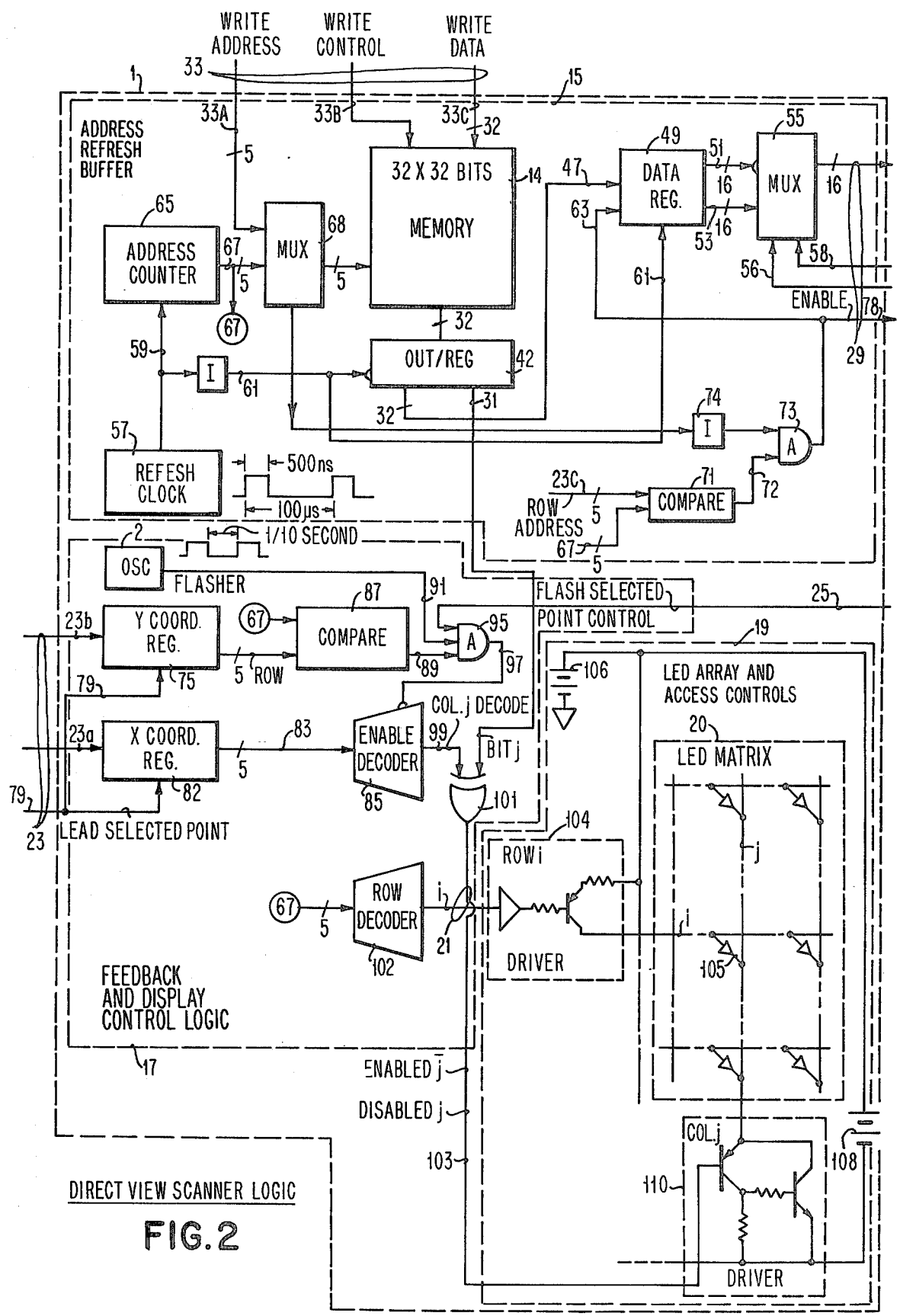
FIG. 2 shows the direct view scanner detailed logic of the light emitting diode array, the feedback and display control logic, and the address refresh buffer.

The following description of the method and apparatus for practicing the method involves logic elements as shown, for example, in FIGS. 1 and 2 and also the execution of selected information handling sequences by a CPU interacting with the direct view scanner attachment in FIG. 1. The CPU may be any stored program controlled machine having the capability of executing sequences in a general high-level language such as APL. The sequences in question are represented and described in connection with their tabular representation. One CPU capable of executing such sequences is described in Amdahl, U.S. Pat. No. 3,400,371, "Data Processing system" issued on Sept. 3, 1968 having resident an APL/360 interpreter described for example in IBM Publication LY20-0678 entitled, "APL/360-OS and APL/360-DOS System Manual," published in February 1965. Another CPU capable of directly executing APL statements is the IBM 5100 containing an APL interpreter in firmware. This is described in IBM 5100 Math/APL User's Guide, First Edition, August 1975 Publication No. 5721-XM2.

Referring now to FIG. 1, there is shown a system embodiment of the direct view scanner attachment 1, in combination with a cursor formed from an image scanner 3 and position encoder 5, a keyboard 7 and a CPU 27. The attachment, cursor, and keyboard are intercoupled with the CPU over a common bus 9. The image scanner portion of the cursor is coupled to the bus through path 33, address refresher buffer 15, and path 29. The position encoder portion of the cursor ties into bus 9 through path 37, coordinate register 11, and path 35. Keyboard 7 is likewise bus connected over path 39.

Lastly, the attachment 1 receives special purpose signals from CPU 27 in logic element 17 over bus connected paths 23 and 25.

Logic element 17 comprises a plurality of row decoders illustrated by row decoder 102 for the purpose of applying a selection signal to counterpart rows of a matrix array of light emitting diodes through the necessary access controls 19. Illustratively, row decoder 102 applies a signal on the ith conductor of path 21. This causes the current row driver 104 to place a current level on the ith row of the LED matrix 20 per se. A column signal driving column driver 110, if coincident with a signal on the ith row, would cause LED 105 to be selected and energized. In this regard, LED array 20 represents an array of picture elements depicting only the $M \times N$ picture elements constituting the field of view (surface area) being scanned by image scanner 3.

In order to drive LED matrix 20 a memory of the display refresh buffer type 41 which is capable of accessing matrix rows or columns at a time should be used. Examples of memory 14 may be found in the accumulating memory described in Eiselen, U.S. Pat. No. 3,976,982, "Apparatus For Image Manipulation" issued Aug. 24, 1976, and a conventional word organized random access memory modified for accessing array vectors in Morrin et al, U.S. Pat. No. 3,995,253, "Method And Apparatus For Accessing Horizontal Sequences, Vertical Sequences, And Rectangular Sub Arrays From An Array Stored In A Modified Word Organized Random Access Memory System".

The array represents the conventional white and black pels within the above-mentioned scanner field of view. The information extracted from memory 14 through output register 42 is a vector whose bits activate counterpart column drivers of LED matrix 20. The counterpart row being activated over a series path connection from address counter 65, path 67 and the counterpart row decoder activating the counterpart row driver. The input into memory 14 includes the raster scan line vector from image scanner 3 communicated over path 33, the write address of which is sent over path 33a to multiplexor 68. The scan data is entered into memory 14 over the 32 bit wide path 33c. Both the memory write operation and the multiplexor are synchronized by write control over path 33b.

The scanned pel array as generated by scanner 3 is first stored in refresh buffer 15 over path 33. The pel array is then distributed to the LED array and the CPU. It is furnished to CPU 27 over path 29 and bus 9. The information thus furnished is for the purpose of having the CPU detect and calculate the coordinates of a geometric feature of interest within the scanned array and for transmitting position coordinates so as to control a feedback indication to the operator on LED array 19. Restated, the computer operates on the $M \times N$ array of bits in the scanner field so as to select a designated point in a geometrical area of interest. The operator is then permitted to view the point being digitized on a $M \times N$ array of indicator lights mounted on the scanner head.

Referring now to FIG. 2, when taken together with FIG. 1, there is shown an LED array and access control 19 which serves as a local output display and preferably comprises a $32 \times 32$ pel array. This $32 \times 32$ array is driven from refresh buffer 15. The refresh buffer includes a $32 \times 32$ bit memory 14 into which the bit streams of ones and zeroes representing successive raster scan lines from image scanner 3 are inserted. The refresh buffer is loaded from the scanner 3 interface which uses the write data bus portion 33C for the transmission of 32 bits of a row of the array. The use of a crosshatch mark directly on a path, together with a neighboring number designates the number of parallel conductors forming said path. This is further exemplified in the write address bus 33A which includes 5 parallel conductors supporting a 5 bit address indicative of which row of the array is being loaded. The third part of path 33 comprises write control line 33B. Line 33B is pulsed in accordance with the memory specification in order to load 32 bits of information being transmitted on data bus 33C to the selected row. Write control line 33B also regulates the 2×1 data selector MUX 68. A signal on control line 33b synchronizes and enables the selection of a location in memory 14 as specified by the contents of counter 65 and the appearance of the 32 bit vector on write line 33c. This selector switches the write address to the refresh buffer 15.

Display refresh involves the following operations. A new row of the LED matrix 20 in the LED array and access control element 19 is illuminated every 100 micro-seconds. Clock 57 generates a periodic pulse sequence over path 59 to address counter 65. An inverted version of this pulse sequence is applied over path 61 to address refresh buffer output register 42 and data register 49. At the beginning of the refresh cycle, address counter 65 is advanced by one count. The new count feeds through MUX 68 over path 67 memory 14. The duration of each clock pulse exceeds the access time of the memory 14, the fall of the pulse being inverted to enable the clocking of the data from memory 14 into the output register 42. This occurs approximately 500 nanoseconds after counter 65 is incremented.

The row of LED matrix 20 to be accessed is determined by the contents of counter 65. Row decoder 102 is coupled to counter 65 over path 67. There are 32 outputs from said decoder, one for each of the P=32 rows. The contents of the counter cause a signal to be placed for instance on a corresponding one of the i rows. Such a decoder circuit may be implemented as shown in "The TTL Data Book for Design Engineers," First Edition, Texas Instruments Inc., 1973 at pages 308-311. In FIG. 2 of the drawing, the output of row decoder 102 is shown communicating over the line for row i. This in turn feeds the row i driver 104. It should be noted that the LED matrix 20 is powered by suitable batteries 106 and 108 so that the row and column drivers (104, 110) are properly driven at all times.

Assume for the moment that the signal applied to exclusive OR gate 101 on path 99 is a 0. This means that the value of bit j on path 31 from output register 42 is sent directly via gate 101 to path 103. Path 103, in turn, feeds column j driver 110. When both row i and column j are selected, then light emitting diode 105 of the LED array 19 is illuminated.

CPU 27 obtains the image via its bus 9. The image, the array of ones and zeros, stored in memory 14 and obtained from image scanner 3 over path 33 is transferred a row at a time from memory 14 to the CPU. It presents the desired row address over path 23C. Path 23C terminates in compare circuit 71 as shown in FIG. 2. This is compared to refresh address from counter 65 over path 67 via compare circuit 71. If the addresses are identical, then line 72 terminating at AND gate 73 has a 1 thereon. However, if scanner 3 is not writing as determined by inverter 74, then data register 49 is enabled via a signal gated through AND gate 73 over path 63. The row bits are clocked into register 49 via clock line 61.

The enable signal on line 78 also feeds CPU 27 as a conductor on path 29. The enable signal operates as an indication of the arrival of data in data register 49. The selector MUX 55 passes each 32 bit word from data register 49 to bus 9, 16 bits at a time under control of the CPU via select line 56 and enable line 58. Restated, the function of AND gate 73 and its inputs is to inhibit the transfer of data to the CPU while the scanner is writing data into the memory 14.

In addition to the capability of reading the image pels, the CPU can through instruction sequences, detect at least one point of a set of contiguous points in the array having the same color value and representing a geometrical feature such as an intersection of lines, the end point of a line, or a centroid. This is in order to indicate by feedback means, to the operator, the location of the most probable point of an object in the field selected for digitizing which is closest to a reference point. A mechanism for blinking or flashing the light emitting diode corresponding to that point is provided. The point is identified by a 5 bit Y coordinate, and a 5 bit X coordinate. This information is placed, by the CPU, on paths 23A and 23B, respectively. The data is clocked into registers 82 and 75 by a pulse from CPU 27 on line 79. The column of the selected point feeds decoder 85 via path 83. However, in order to activate the decoder 85 and place a signal on path 99, an activate signal must be placed on path 97 which controls decoder 85 through AND gate 95. This AND gate 95 is in turn under control of a signal from the CPU over path 25. This means that a "one" on path 25 will activate gate 95 while a zero will disable the gate. A 0 on path 25 is indicative that no point has been selected.

Given that the contents of address counter 65 are the same as the contents of register 75 then compare circuit 87 will cause a 1 input to AND gate 95 over path 89. Address counter 65 is coupled to compare circuit 87 over path 67, which circuit also terminates the output from register 75. Preferably, the enablement of the decoder 85 occurs every other 1/10 of a second via clock line 91. This results in an active signal for every other 1/10 second time increment on the decoded signal line 99 shown in this case as column line 99 at the time of row selection. When active, a signal on line 99 will cause the bit corresponding to the selected point to be inverted. That is, if the bit value indicates that the LED should be turned on, it is turned off and vice versa. During the other 1/10 second of the period, the LED is normally illuminated. This results in the light blinking at the rate of 5 times per second. Note that the output of address counter 65 appears on path 67. The 5 bits of this count are simultaneously applied to circuit 71 for comparison with the predicted row address from CPU 27 as applied over path 23C from bus 9, circuit 87 for comparing the count with the 5 bit Y coordinate from register 84 actually calculated by the CPU and transmitted to the coordinate registers 82 and 84 over respective paths 23A and 23B. Lastly, the output from counter 65 on path 67 is placed into row decoder 102 for selecting driver 104 and placing the appropriate DC level on row i of LED array 19. Similarly, the selection of column j driver 110 when exclusive or 101 passes a 1 on path 103. The column j driver places a DC level negative in polarity to the level on the i row line such that the selected LED diode 105 is appropriately biased to pass current therethrough and emit light.

Functionally, the invention includes the attachment of an optical scanning device to a conventional tablet cursor. The scanner consists of a M×N array of light sensitive cells whose center cell corresponds in position to the cross hair intersection. When the operator depresses the tablet switch i.e. actives position encoder 5 on the cursor, two events are triggered. First, the cursor position is recorded in coordinate register 11 over path 37. The "picture" of the array area surrounding the cursor is sensed by the scanner and is transmitted to CPU 27 through buffer 15 over path 29 and bus 9. The CPU executes evaluation instruction sequences in order to determine the appropriate digitizing coordinates of the point in the array most likely to be chosen by the operator if he were to execute the same function manually. This information is fed back over paths 23 and 25 by way of bus 9 to feedback in control logic 17. Thus, there are implemented the method steps of digitizing the instantaneous contact positions between the cursor and the surface as reference coordinates, detecting the presence of at least 1 point of a set of contiguous points representing a geometrical feature such as a line intersection or a calculation of a centroid of the same preselected color value within a predetermined surface area about the cursor, and digitizing the position of any detected or calculated point as a displacement from the reference coordinates.

One significant aspect of this invention is the selection of a digitizing point from the scanned M×N array. The objective is, again, to select that point most likely to be chosen by an operator were he to execute the same function manually. Thus, on a line drawing the point as selected might usually be the intersection of lines or given an area of contiguous points of the same color value, then the centroid would be selected by the CPU as the point most likely to be chosen. In this regard, FIG. 5 shows a trapezoidal pattern of black pels on a white field. Areas of contiguous color values are termed "objects."

It is a related aspect of this invention that a perfect selection by the CPU 27 is not a necessary and sufficient condition. Since the CPU selected point is automatically displayed as superimposed on the LED array 19, then the operator always has the option of either manually overriding or selecting, for example, the central point of the field, see FIG. 5. However, if the disagreement between the CPU selected point and that of the operator occurs only a small fraction of the time, then the enhanced rate of input of drawing coordinates provided by this invention will not be greatly reduced thereby. In attempting to select this most probable point from the field of values presented to it, the CPU attemps to obtain straight line descriptions of the object in the field again as shown in FIG. 5.

Figure 3:
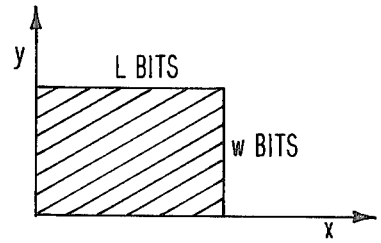
FIG. 3 shows the line description by moments.

Referring now to FIG. 3, there is shown a perfectly rectangular line segment described in terms of its first and second order moments. It has been experimentally observed that these equations constitute reasonable approximate line descriptions for non-ideal segments such as those obtained by a scanning device. In practice, the line segment would usually be oriented at some angle to the scanner X and Y coordinates, so that the values $\sigma_x^2$ and $\sigma_y^2$ would be replaced by the maximum and minimum Eigenvalues, respectively. The orientation will be given by the major Eigenvector. The required calculations involve only the second order central moments $\sigma_x^2$, $\sigma_y^2$, $\sigma_{xy}^2$. The calculation of these values may be obtained from the moment observations set forth in FIG. 3.

Referring now to FIG. 4, there is shown a flow diagram of the typical CPU 27 process responsive to raster scan lines of information supplied from scanner 3 through buffer 15 over path 29. This process consists of 3 parts. First, there is a routine that proceeds across the array left to right, one vertical scan line (column) at a time, recording the connectivity relation between the present scan and the previous scan, and accumulating moment calculations. Second, a final calculation of the approximating geometry is made, and lastly, a selection of the coordinance of the output point to be fed back to the operator. The sequences of instructions executed by CPU 27 are respresentatively set forth in the following tables 1 through 8. The statements are written in APL/360 language as described, for example, in the APL/360 Reference Manual, 2nd Edition, by Sandra Pakin, Science Research Associates, Copyright 1972, and "APL/360 An Intuitive Approach," L. Gilman et al, 1970, John Wiley & Sons, New York L.C. 71-147788, and also "APL Language," IBM Publication GC 26-3847-0, First Edition, March, 1975.

Each of the tables comprises a series of statements indexed by line numbers. The line numbers merely indicate that the statements are to be taken in consecutive order, starting with statement 0 and terminating with the highest numbered statement in that table.

Contemporary operating the data base systems running on an IBM 360 computer of the type described in the aforementioned Amdahl patent include high level language interpreters, compilers and linkage editors so that sequences written in high level procedure oriented languages, such as PL/1 may be readily converted into machine instructions. APL interpreters differ from compilers in that interpreters translate and execute each source language statement before translating and executing the next one. Compilers produce a machine language code to be executed at a later time. However, it is believed that the proper appreciation of this phase of the invention requires an explanation of the function sought to be achieved by the execution of each of the sequences, both with respect to the counterpart activity illustrated in the flow diagram of FIG. 4 as well as the underlying algorithmic rationale.

There are broadly two circumstances where a calculation by CPU 27 need not be invoked. The first is where the M×N array consists of all zeros, indicating an all white field. The second circumstance is where there is blackness everywhere. Here the point of interest would be at the geometric center of the array. Now there are limiting conditions to the power of the system to identify a point in the array field. The system requires at least one non-zero pel in order to yield a calculated point. As may be recalled, the CPU is trying to guess where the operator would position the stylus on the basis of where the stylus is presently positioned plus the additional information determined by the pel array. There are circumstances where the "guess" would be inadequate. That is one for which a simple algorithm could not "calculate" a centroid. An example of this would be a checkerboard pattern of 1's and 0's. Another consideration is the criticality of timing, that is, CPU 27 should be able to determine a centeroid faster than a human being. This can be controlled by setting a maximum length of time and should be no longer than the greater of (a) the time to determine that the pel pattern is "noise" or (b) the content of the array and the algorithmic compute time. Thus the scattergram of small objects would be evidently longer to process than a single large object.

FIG. 4 represents the general flow diagram for the main instruction sequence set forth in Table 1. In this regard, the basic unit of execution is the statement as represented to the right of each corresponding line number. The main program includes reference to subroutines, which reference is made by the APL interpreter by execution of an ordinary labeled statement.

TABLE 1

| LINE NO. | STATEMENT |
|---|---|
| 0. | Z←DIGITIZE PAT |
| 1. | ᴀ Z IS X,Y COORDS OF CRITICAL POINT |
| 2. | TIME←□AI[2] |
| 3. | INITIALIZE_OBJECTS |
| 4. | N←O |
| 5. | BR:N←N1 |
| 6. | N ANAL_SCAN PAT[;N]. |
| 7. | →END×ι(ρTOP)=0 |
| 8. | CONNECTIVITY |
| 9. | END:→BR×ι(N<1↓ρPAT) |
| 10. | LINE←CHOOSE_LRGST LINES |
| 11. | DIMENS←CALC_LINE LINE |
| 12. | CASE←DETERMINE_CASE |
| 13. | Z←SELECT_POINT CASE |
| 14. | □AI[2]-TIME; 'MILLISEC' |
| 15. | Z←1 ⌈ ⌊ Z |
| 16. | Z←(ρPAT) ⌊ Z |
| 17. | PAT[Z[1];Z[2]]←3 |
| 18. | PAT[CTR[1];CTR[2]]←3 |
| 19. | '*□0'[1PAT] |

Examples of such subroutine references in the main program include statements 3, 6, 8, and 10-13. The name of any sequence or subsequence, also called subroutine, is recited in line 0 of the respective routine. Parenthetically, line 1 in Table 1, is only a comment field and is not executed by the APL interpreter. Similar comment fields will appear in other to be described sequences. In the subsequent discussion, the term line or statement number will be used interchangeably.

Referring again to Table 1, in statement 0 "Z" is the variable representing the selected points, the coordinates of which will be communicated from CPU 27 to logic 17. The remainder of statement 0 is the label digitized pattern. The coordinates are outputted in statements 15 and 16 while statements 17 through 19 are directions to any output indicating device, be it a CRT or a printer, to represent the selected point Z by a special symbol denoted by numeral 2 on the right-hand side in statement 17. Also, the center of the array would be denoted by a special symbol numeral 3 denoted in the right-hand side of statement 18. Statement 19 is a direction that point of blackness normally represented by 1's be denoted or printed as stars. An example of this is to be found in FIG. 5 where the selected Z is depicted with a rectangular symbol, while the center of the pattern field is designated by a 0.

Statement 1 is a common field reminding the observer reading the APL program sequence that Z is designated as representing the X,Y explicit coordinates of the critical point. As mentioned previously, comment fields are never executed.

Statements 2 and 14 respectively represent the initialization of an elapsed time indicator by storing the clock value in a predetermined memory location and the reading of the clock by comparing it with its last value to determine how long it took to compute the coordinates of point Z.

Statements 3 through 13 constitute the "bare bones" of the processing algorithm. To start things off, statement 3 entitled, "INITIALIZED OBJECTS" is a label referencing the subroutine having the same name and function set forth in Table 2.

TABLE 2

| LINE NO. | STATEMENT |
|---|---|
| 0. | INITIALIZA_OBJECTS |
| 1. | ᴀ INITIALIZES MOMENT AND POSITION RECORDS FOR OBJECTS IN FIELD |
| 2. | TOP←BOT←0ρ 0 |
| 3. | MMTS←0 6ρ 0 |
| 4. | POS←0 6ρ 0 |
| 5. | NLINE←0 |
| 6. | LINES←0 12ρ 0 |

The initialization of moment and positions to 0 is saying functionally that the various variables which characterize a string of black pels as an M×N array are described by their geometric position such as the top and bottom row location in each column of the array being scanned, the moments of the line and its number. Also, in statements 2, 3, 4 and 6 of Table 2, the size of the vector or array is dimensioned. After the objects and variables have been initialized, i.e. set to 0 and dimensioned, control is returned to the main program of Table 1. And the next statement, statement 4, is executed. This, too, is an initializing operation in that N representative of the column number of the current column being processed is set to 0. Also, statements 5 and 9 in the main program of Table 1, respectively represent a line label or marker and a test of whether the variable of interest, in this case N, is equal to or less than a given limit. If it is not, then control is returned to statement 5 and statements 6 through 9 are executed again. Statements 5 through 9 represent the statements and loops in the flow diagram of FIG. 4 starting with N=N+1 and ending with "last scan?". Statement 5, in addition to being a label or line marker, also causes the N value to be incremented by +1 each time through the loop. This corresponds to the processing of consecutive vertical scan lines in the M×N array. In statement 9, as suggested previously, control would return to statement BR line 5, unless N were the last column in the array. If the latter is the case, then control goes to line 10 of the main program. This corresponds to the choosing of the largest object in the array on FIG. 4. The actual scanning and analysis of the array occurs in the subroutine referenced by statement 6 in the main program of Table 1 designated "N ANAL SCAN PAT[;N]." This subroutine is set forth in Table 3.

TABLE 3

| LINE NO. | STATEMENT |
|---|---|
| 0. | N ANAL_SCAN X;A;B;T;NUM;P;SX;SY;TX;TY;TXY;M |
| 1. | ᴀ FINDS TOP AND BOT OF BLACK STRINGS IN SCAN N |
| 2. | ᴀ COMPUTES MOMENTS AND POSN INFO |
| 3. | ᴀ SAVE OLD STRING COORDS |
| 4. | T←NLINE ↓ TOP |
| 5. | B←NLINE ↓ BOT |
| 6. | TOP←(X,0)∧(~0,X) |
| 7. | BOT←X∧(1↓~X),1 |
| 8. | TOP←,TOP/ι(1+ρX) |
| 9. | BOT←BOT/ιρX |
| 10. | ᴀ POS DATA |
| 11. | P←φ(3,ρTOP)ρ((ρTOP)ρN),TOP,BOT |
| 12. | P←P,P |
| 13. | ᴀ MOMENT DATA |

TABLE 3-continued

| LINE NO. | STATEMENT |
|---|---|
| 14. | NUM←1+BOT−TOP |
| 15. | SX←N×NUM |
| 16. | TX←N×SX |
| 17. | SY←(NUM×(TOP+BOT))÷2 |
| 18. | TY←((2×(BOT*3)−(TOP*3))+(3×(TOP*2)+(BOT*2))+(BOT−TOP))÷6 |
| 19. | TXY←(N×NUM×(TOP+BOT))÷2 |
| 20. | M←φ(6,ρNUM)ρNUM,SX,SY,TX,TY,TXY |
| 21. | POS←POS,[1]P |
| 22. | MMTS←MMTS,[1]M |
| 23. | TOP←T,TOP |
| 24. | BOT←B,BOT |
| 25. | NLINE←ρT |

The function of the subroutine N ANAL SCAN is to identify strings of black pels. This is accomplished by scanning one vertical column at a time for a string of black pels and then generating a description of any string so detected. The description would include a magnitude, location, and the calculation of moment data. As pointed out in comment statements 1, 2, and 3, statements 4 through 9 relate to ascertaining the top and bottom coordinates of the rows beginning and ending of a string of black pels in the vertical column being processed. Also, as indicated by comment statement 13, statements 14–20 concern the computation of moment data.

The subroutine in Table 3 represents a subloop formed by statements 6 and 7 of the main program in Table 1. This subloop is within the larger loop between statements 5 and 9, also of the main program in Table 1.

In this regard, statement 7 in Table 1 is a branching statement which relinquishes control to statement 8 of Table 1 if there are no more black pels within a string. Statement 8 of Table 1, labeled "CONNECTIVITY" references the subroutine in Table 4.

TABLE 4

| LINE No. | STATEMENT |
|---|---|
| 0. | CONNECTIVITY |
| 1. | INT←(TOP° .≦BOT)∧(BOT° .≧TOP) |
| 2. | GRPS←(WARSHALL INT),0 |
| 3. | BR:→OUT×ι(L←−1↑(GRPS=0)/ρGRPS)=0 |
| 4. | GRP←GRPS[ιL−] |
| 5. | GRPS←L↓GRPS |
| 6. | →CONTINUE×ι(ρGRP)>1 |
| 7. | ⋂ NO CONNECTIVITY BETWEEN SCANS |
| 8. | →CONTINUE×ι(GRP>NLINE) |
| 9. | ⋂ LINE ENDS |
| 10. | LINES←LINES,[1](,POS[GRP;]),(,MMTS[GRP;]) |

TABLE 4-continued

| LINE No. | STATEMENT |
|---|---|
| 11, | →BR |
| 12. | CONTINUE: |
| 13. | ⋂ COMBINE MEMBERS OF GROUP |
| 14. | MMTS←MMTS,[1](+/[1]MMTS[GRP;]) |
| 15. | POS←POS,[1](⌊/[1]POS[GRP;1 2]),(⌈/[1]POS[GRP;3 4]),(⌊/[1]POS[GRP;5]),(⌈/[1]POS[GRP;6]) |
| 16. | →BR |
| 17. | OUT:MMTS←((ρTOP),0)↓MMTS |
| 18. | POS←((ρTOP),0)↓POS |

The function of the instruction sequence of Table 4 is to associate strings of black pels found in the current vertical column being scanned with strings in the previous columns. The second function is to accumulate all of the moments, moment calculations being additive. This is indicated in FIG. 4 by the two steps of connectivity between scans N and N−1 and combining of objects in the scans N and N−1, or either beginning or ending with scan of objects in a field. In this regard, statement 1 in Table 4 is of interest to the extent that it finds the points in common between the present and previous scan lines. Also of interest is statement 15 which operates to modify the variables TOP and BOT if there is more than one string in a group.

The output of the "connective" subroutine in Table 4 consists of Moment description, such as centroids, moments of inertia of the black pel strings of each of the columns forming a given object in the field. Statement 2 in Table 4 references a sub-subroutine designated Z WARSHALL set forth in Table 4A.

TABLE 4A

| LINE NO. | STATEMENT |
|---|---|
| 0. | Z←WARSHALL LINK;LIST;DIMS;CON;MEMB;NEW;L |
| 1. | ⋂ Z IS A PARTITION OF ELEMENTS HAVING CONNECTION MATRIX LINK |
| 2. | LIST←ι(ρLINK)[1] |
| 3. | Z←0ρ 0 |
| 4. | BR:DIMS←ιρNEW←MEMB←LINK[1;] |
| 5. | TOP:CON←MEMB∨(∨/[1]LINK[NEW/DIMS;]) |
| 6. | MEMB←MEMB (NEW←CON ∧ ~MEMB) |
| 7. | →TOP×ι(∨/NEW) |
| 8. | L←(~MEMB)/ιρLIST |
| 9. | Z←Z,(MEMB/LIST) |
| 10. | →O×ι(ρL)=0 |
| 11. | Z←Z,0 |
| 12. | LIST←(~MEMB)/LIST |
| 13. | LINK←LINK[L;L] |
| 14. | →BR |

The function of this sub-subroutine is to form the complete association of what strings are connected together to form objects. In the nomenclature of this graph theoretic algorithm, this sub-subroutine assigns strings to groups. This is manifest in the form of a list to be used in the "connectivity table". This grouping is utilized by connectivity subroutine of Table 4.

Upon completing the description and connectivity determination of the strings in the last column of the array, control is transferred to statement 10 in the main program of Table 1.

Statement 10 references the subroutine set forth in Table 5 directed to choosing the largest of the lines for the point to be selected will be on said largest line. Other line data will be discarded.

TABLE 5

| LINE NO. | STATEMENT |
|---|---|
| 0. | Z←CHOOSE_LARGST LINES |
| 1. | ⋒ CHOOSES LARGEST OBJECT IN FIELD |
| 2. | LINES←,LINES[1 ↑ ⍋ LINES[;7];] |
| 3. | ⋒ OBTAIN LINE APPROX TO THIS OBJECT |
| 4. | CG←LINES[8 9]÷LINES[7] |
| 5. | COV←(LINES[10 11 12]÷LINES[7])-(CG*2),(×/CG) |
| 6. | Z←LINES |
| 7. | Z[7+ι5]←CG,COV |
| 8. | CG←φCG |

The data into the largest line selection subroutine of Table 5 are the moment descriptions, such as centroids, moments of inertia, etc. Statement 2 in Table 4 orders the lines of size. Statement 4 finds the center of gravity of the lines, while statement 5, the covariance, represents a matrix of normalized moments of inertia from which the largest line is selected and all other line data is discarded. Statements 6 through 8 constitute the replacement of a moment description of the selected line with its geometric equivalence. This equivalence would be a normalized geometric description such as the center of gravity. The selection of the largest line and its geometric description, permit control to be returned to the main program, statement 11 in Table 1, thereof.

The function of the subroutine is to convert the largest line containing the point "Z" of interest into the explicit dimensions of length, thickness, and angle with respect to a horizontal reference explicitly.

TABLE 6

| LINE NO. | STATEMENT |
|---|---|
| 0. | Z←CALC_LINE LINE;A;B;C;R;COV;CG;LAMDA;SINE |
| 1. | ⋒ COMPUTES LINE DESCRIPTION FROM CG AND MOMENTS |
| 2. | CG←LINE[8 9] |
| 3. | COV←LINE[10 11 12] |
| 4. | B←(+/COV[1 2])÷2 |
| 5. | C←(×/COV[1 2])-COV[3]*2 |
| 6. | R←((B*2)-C)*0.5 |
| 7. | LAMDA←B+(R, -R) |
| 8. | Z←((12×LAMDA)+1)*0.5 |
| 9. | SINE←LAMDA DO_SINE COV |
| 10. | Z←Z,SINE |

The information presented from the subroutine in Table 5, is in the form of a vector of five numbers, including the center of gravity and moments. Statements 4 through 6 of Table 6 represent the calculation of a subvariable lamda. Statement 8 is the determination of a square root, while statement 10 is a reference to a sub-subroutine to be found in Table 6A.

TABLE 6A

| LINE NO. | STATEMENT |
|---|---|
| 0. | Z←LAMDA DO_SINE COV;A;B;C;T |
| 1. | ⋒ COMPUTES MAJOR EIGENVECTOR |
| 2. | A←COV[3] |
| 3. | B←LAMDA[1]-COV[2] |
| 4. | C←LAMDA[1]-COV[1] |
| 5. | →COAX×ι(A=0) |
| 6. | T←B÷A |
| 7. | Z←T÷(1+(T*2))*0.5 |
| 8. | →0 |

TABLE 6A-continued

| LINE NO. | STATEMENT |
|---|---|
| 9. | COAX:→VERT×ι(B=0) |
| 10. | HORIZ:SINE←0 |
| 11. | →0 |
| 12. | VERT:SINE←1 |

This sub-subroutine is directed to computing the major Eigenvector. When this is accomplished, control is returned to the subroutine in Table 6, signifying the completion of statement 10 in Table 6. Control thereafter is returned to the main program in Table 1, statement 12.

Statement 12 in Table 1 references the subroutine set forth in Table 7. This sequence has as its object of determining (1) whether the line explicitly described in the subroutine of Table 6 passes through the field, in which case it is represented by a "1"; or (2) whether the line ends in the array and is therefore to be represented by a "0".

TABLE 7

| LINE NO. | STATEMENT |
|---|---|
| 0. | CASE←DETERMINE_CASE;A;B;DUM;LX;LY |
| 1. | ⋒ DECIDES IF LINE TERMINATES IN FIELD |
| 2. | ⋒ CASE=1 IF LINE PASSES THROUGH |
| 3. | DUM←(LX←(ρPAT)[2]),(LY←(ρPAT)[1]) |
| 4. | A←LINE[ι6] |
| 5. | B←A=1,1,LY,LX,1,LY |
| 6. | CASE←( V/B[ι3])∧( V/B[3+ι3]) |

At the determination of the line passing or ending through the array in the sequence of Table 7, control is passed again to the main program statement 13 of Table 1. In this regard, statement 13 references the subroutine to be found in Table 8 for selection of the actual point "Z".

The function of this subroutine in Table 8 is to select the coordinates of the line center if, as in case 1 determined in subroutine of Table 7 the line passes through the array, or to select the coordinates of the line end if as in case 2 of subroutine of Table 7 the line ends in the array.

TABLE 8

| LINE NO. | STATEMENT |
|---|---|
| 0. | Z←SELECT_POINT CASE |
| 1. | ⋒ CHOOSES DIGITIZING POINT |
| 2. | COS←(1-SINE*2)*0.5 |
| 3. | CRT←0.5×ρPAT |
| 4. | →(CASE,~CASE)/NEAREST END_PT |
| 5. | NEAREST: |
| 6. | LGTH←(CTR-CG).×(COS,SINE) |
| 7. | Z←CG LGTH×(COS,SINE) |
| 8. | →0 |
| 9. | END_PT: |
| 10. | Z←CG LINE_END DIMENS |

It is of some interest that statement 8 in Table 8 references a sub-subroutine to be found in Table 8A. The sub-subroutine treats the problem that if the point to be selected for line end would lie just outside the boundary of the array that a point within the array is nevertheless selected. For purposes of completeness this latter sub-subroutine is herein included.

TABLE 8A

| LINE NO. | STATEMENT |
| --- | --- |
| 0. | Z←CG LINE_END DIMENS;P1;P2;DEV;CTR |
| 1. | ⍝ FINDS LINE END POINT |
| 2. | DIMENS[1 2]←0.DIMENS[1 2] |
| 3. | CTR]⌈ 0.5×⍴PAT |
| 4. | P1←CGDEV←(DIMENS[1])×((1-DIMENS[3]*2)*0.5),DIMENS[3] |
| 5. | Z←P1 |
| 6. | P2←CG-DEV |
| 7. | →0×⍳(/(CTR-P1)*2)≦(/CTR-P2)*2) |
| 8. | Z←P2 |

Given that a whole object occupies the array or only a point exists, then the centroid would be ordinarily selected.

As a consequence of the processing of the pels in CPU 27 according to the above-described instruction sequences, if two or more disconnected black patterns are observed within a given M×N array, the CPU will select the (x,y) position derived from the larger object. This rule makes the operation insensitive to stray noise bits in the array. It should be further noted that two moment descriptions may be combined during tracking if their respective bit patterns interconnect at some cross position. This may happen due to stray bits jutting out to the left, for example.

Knowing the x coordinate of the scan and the top and the bottom pel positions ($y_t$ and $y_b$) for a connected strip of black pels in a current vertical scan or column, then the previous moments are easily updated. This is illustrated with reference to the following relationships between the bottom and top pel positions, line number, N representing the x coordinates. In this regard, S represents first order moments and T represents second order moments.

TABLE 9

$N_{(n)} = N_{(n-1)} + (y_t - y_b + 1)$ Total number of black pels $$S_x(n) = S_x(n-1) + (y_t - y_b + 1) X$$
$$S_y(n) = S_y(n-1) + \frac{(y_t - y_b + 1)(y_t + y_b)}{2}$$
$\Big\}$ 1st order moments $$T_x(n) = T_x(n-1) + (y_x - y_b + 1) X^2$$
$$T_y(n) = T_y(n-1) + \frac{2(y_2^3 - y_b^3) + 3(y_t^2 + y_b^2) + (y_t - y_b)}{6}$$
$\Big\}$ 2nd Order moments $$T_{xy}(n) = T_{xy}(n-1) + \frac{X(y_t - y_b + 1)(y_t + y_b)}{2}$$

To recapitulate, there has been described an apparatus including in combination a cursor, an optical scanner, and a mechanism for displaying of a centroid of black objects observed in the field of the optical scanner with the addition of a computing element for determining the centroid value. The scanner consists of an M×N array of light sensitive cells whose center cell corresponds in position to a cross hair intersection. When an operator actuates the cursor, inclusive of the scanner, two events are registered. First, the cursor position is recorded, and second, the image viewed by the scanner is transmitted to the computing element. The computing element utilizes the centroid of any black object in its field as the digitized position of interest. Because of this, an operator only need place the cursor in an approximate location of a geometric feature in order for it to be digitized. This speeds the process and increases the accuracy of data input.

It is evident that the method and apparatus of this invention may be modified, such that there exists several intersecting lines in the field of view than the point of intersection will be recorded. To the extent that there exists nonintersection line or lines, then the line center nearest the beforementioned cross hair intersection would be recorded.

Since certain changes may be made in the above apparatus without departing from the scope of the invention herein involved, it is intended that all matter contained in the above description and shown in the accompanying drawing shall be interpreted in an illustrative and not in a limiting sense.

What is claimed is:

1. A machine implementable method to improve the positional accuracy and speed of an operator controlled cursor engaged in the digitized encoding of graphic information on an electronic data entry surface, said cursor being formed from a position encoder, means for registering the coordinates of the contact position of the encoder on the surface, a scanner for generating a coded array of data points of a corresponding part of the surface area, and display means for projecting the scanner view of the surface, the method comprising the steps of:

digitizing the instantaneous contact position between the cursor and the electronic data entry surface as reference coordinates;

detecting any segment of a colored object, which segment consists of at least one point of a set of contiguous points of the same color value upon the surface within a predetermined area (N×N pel array) about the cursor;

ascertaining the centroid location of any detected segment within a M×N array of color value points representative of the predetermined surface area, and causing the display means to differentially indicate the location of the ascertained centroid relative to the detected segment.

2. A method according to claim 1, wherein the steps of detecting any segment of a colored object includes the steps of:
- ascertaining the length of one or more strings of points of the same color value within each one of the N consecutive raster scan lines;
- establishing the size of the largest colored object by combining strings having common points in successive scan lines; and
- selecting the largest colored object by identifying the longest string.

3. A method according to claim 1, wherein the step of ascertaining the location within the array of the centroid of the detected segment includes the steps of:
- ascertaining whether the detected segment constitutes a line passing through the array or whether it represents a line ending within the array.

4. A method according to claim 1, wherein the step of digitizing said ascertained location includes the step of:
- selecting the array coordinates of the line center if the line passes through the array, or selecting the coordinates of the line end if the line terminates in the array.

5. In an apparatus for improving the positional accuracy of an operator controlled cursor engaged in the digitized encoding of graphic information on an electronic data entry surface, said cursor being formed from a position encoder; means for registering the coordinates of the initial contact position of the encoder of the surfaces; and an image scanner, the image scanner generating a coded array of data points of a corresponding part of the surface area inclusive of a locus of points defining a geometrical feature; the apparatus further comprising in combination:
- a display;
- a calculating element;
- means including the position encoder registration means coupling the scanner for actuating the display with the scanned and for transmitting said array data to the calculating element;
- the calculating element being responsive to said data for computing the coordinates of the geometrical feature embedded in said data point array of contiguous points having the same preselected coded value; and
- means including the calculating element for causing the display means to differentially indicate the location of the geometrical feature.

6. An apparatus according to claim 5 wherein the display means comprises an M×N array of light emitting diodes, a M and N being positive integer values;
- said means for causing the display means to differentially indicate the location of the geometrical feature include means for causing the selected one of the light emitting diodes to flash.

7. A machine implementable method for minimizing the error between the location of the point contact position of an operator controlled cursor placed on an electronic data entry surface and one point of a locus of points being tracked on said surface, the cursor includes a position encoder, means for registering the coordinates of the contact position of the encoder on the surface, a scanner for generating a coded array of data points of a corresponding part of the surface area, and display means for projecting the scanner view of the surface, the method comprising the steps of:
- registering the location of the contact position as reference coordinates;
- detecting the nearest point of the locus within a predetermined field of view;
- calculating the centroid of the detected locus of points; and
- causing the location of the calculated centroid as a displacement from the reference coordinates to be differentially indicated on the display means.

8. In an apparatus for improving the positional accuracy and speed of an operator controlled cursor engaged in the digitized encoding of graphic information of an electronic data entry surface, said cursor being formed from a position encoder; means for registering the coordinates of the initial contact position of the encoder on the surface; and an image scanner, the image scanner generating a M×N Boolean coded array of data points of a corresponding part of the surface area inclusive of a locus of points defining a geometrical feature, M and N being positive integer values; the apparatus further comprising in combination:
- an M×N array of light emitting diodes;
- a calculating element;
- means including the encoder registration means coupling the scanner for actuating the diode array with the M×N scanned array of data points and for transmitting said array of data points to the calculating element;
- the calculating element being responsive to said data points for computing the coordinates of the geometrical feature embedded in said data point array of contiguous points having the same preselected Boolean coded values (0 or 1); and
- means including the calculating element for causing the diode array to differentially indicate the location of the geometrical feature.

9. An apparatus according to claim 8, wherein the means for differentially indicating the location of the geometric figure includes means for causing a selected one of the light emitting diodes to flash.

* * * * *